United States Patent [19]

Neuhaus et al.

[11] Patent Number: 4,649,991
[45] Date of Patent: Mar. 17, 1987

[54] CROSS-COUNTER-STREAM MODULE FOR HEAT OR MASS EXCHANGE

[75] Inventors: Clemens Neuhaus, Erlenbach; Rüdiger Lucks, Obernburg; Hans G. Breidohr, Wuppertal; Gerhard Wick, Obernburg, all of Fed. Rep. of Germany

[73] Assignee: Akzo NV, Arnhem, Netherlands

[21] Appl. No.: 333,391

[22] Filed: Dec. 22, 1981

[30] Foreign Application Priority Data

Dec. 22, 1980 [DE] Fed. Rep. of Germany ....... 3048559

[51] Int. Cl.$^4$ ............ F28D 7/00; F28F 9/22; B01D 13/00; C02F 1/44
[52] U.S. Cl. ................ 165/159; 165/905; 210/321.1; 210/456
[58] Field of Search .............. 165/158, 159, DIG. 8; 210/646, 321.1, 456, 323.2, 433.2

[56] References Cited

U.S. PATENT DOCUMENTS

| | | | |
|---|---|---|---|
| 3,228,456 | 1/1966 | Brown et al. | 165/159 |
| 3,277,959 | 10/1966 | Withers | 165/180 |
| 3,342,729 | 9/1967 | Strand | 210/321.1 |
| 3,438,434 | 4/1969 | Smith | 165/159 |
| 3,536,611 | 10/1970 | De Filippi et al. | 210/646 |
| 3,557,962 | 1/1971 | Kohl | 210/321.1 |
| 3,660,280 | 5/1972 | Rogers | 210/321.1 |
| 3,989,626 | 11/1976 | Bentley et al. | 210/177 |
| 4,066,553 | 1/1978 | Bardonnet et al. | 210/321.1 |
| 4,082,670 | 4/1978 | Joh | 210/195 R |
| 4,114,683 | 9/1978 | Verlinden | 165/DIG. 8 |
| 4,140,637 | 2/1979 | Walter | 210/321.1 |
| 4,172,794 | 10/1979 | Sigdell | 210/232 |
| 4,293,418 | 10/1981 | Fujii et al. | 55/158 |
| 4,341,631 | 7/1982 | Hargitay | 210/433.2 |

FOREIGN PATENT DOCUMENTS

| | | | |
|---|---|---|---|
| 2721444 | 11/1978 | Fed. Rep. of Germany | 210/232 |
| 0122969 | 10/1978 | Japan | 165/DIG. 8 |

Primary Examiner—William R. Cline
Assistant Examiner—John K. Ford
Attorney, Agent, or Firm—Michael J. Striker

[57] ABSTRACT

A cross-counter-stream module for material and/or heat exchange done with a hollow filament bundle cast into a housing at its ends and a mechanism for conducting the material flow to the outside of the hollow filaments. The hollow filaments are cast at their ends as a stack into a housing, the stack being composed of one or more layers which consist of strata of hollow filaments fixed in a plane through cross-pieces transverse to their lumen directions, the cross-pieces being arranged tightly superimposed at all locations inside one layer, disposed at predetermined constant intervals, with the intermediate spaces between the hollow filaments filled by the cross-pieces at the places of crossing, and with the cross-pieces composed of a polymer with a melting point from 80° to 190° C. and a residual adhesion at room temperature. Preferably, the polymer is a polyamide, a polyethylene, a copolymer of polyethylene and vinyl acetate, or a copolyether-ester. Preferred embodiments include that the cross-pieces display a substantially round cross-section; that the cross-piece diameter correspond to 1.5 to 4 times the hollow filament diameter; that the cross-pieces are put in as warp; that the stack is composed of several layers; that the intervals between adjacent cross-pieces amount to 1–20 cm; and that the cross-piece intervals in different layers form whole number ratios.

7 Claims, 5 Drawing Figures

CROSS-COUNTER-STREAM MODULE FOR HEAT OR MASS EXCHANGE

BACKGROUND OF THE INVENTION

The invention concerns a cross-counter-stream module for material and/or heat exchange done with bundles of hollow filaments closed at their ends by a housing, and apparatus for driving the material stream about the outside of the hollow filaments.

Cross-counter-stream heat exchangers with arrangements for driving the material stream are well known in industrial process engineering, whereby one material stream is led through a tube bundle and the other material stream taking part in the exchange is led around the tubes. Components are provided for driving the material stream around the tubes, which bring about the cross-counter stream. With such heat exchangers having bundles of tubes, the laws of heat exchange have been extensively investigated, so that the efficiency of the heat exchange is calculable and optimizable for a determined direction of flow. One therefore endeavors to employ the same mathematical relationships also to heat exchange with hollow filament modules, and, since the material exchange proceeds according to analogous mathematical relationships, also to material exchange for modules with hollow filament bundles. Since hollow filaments are produced from fiber-forming polymers, it causes difficulties to construct suitable liquid density components for driving the material stream around the hollow filaments.

U.S. Pat. No. 4,082,670 describes a cross-counter-stream module with hollow filament bundles, in which the flow is obtained through an appropriate configuration of the housing.

A cross-stream module is known from U.S. Pat. No. 3,536,611, with which the hollow fillaments, held fast, are coiled about a central distributor tube, through which a liquid is led, transverse to the filament axes, about the hollow filaments, and which is drained through the wall of the housing.

German Offenlegungsschrift DE-OS No. 2,721,444 describes a hollow filament dialyser, with which the hollow filaments are connected together with the aid of fibers into a transverse-lying hollow filament path, and this is coiled about a core. A determined direction of flow for the liquid circulating around is not, however, provided.

SUMMARY OF THE INVENTION

The object of the present invention is the provision of a module with improved output characteristics, the production of which is distinguished through particular simplicity, and offers particular advantages not only for the production of the hollow filaments, but also for the production of the module.

This object is attained according to the present invention through a cross-counter-stream module, which is thereby characterized in that the hollow filaments are cast at their ends as a stack into a housing, and the stack is composed of one or more layers, which consist of strata of hollow filaments fixed in a plane through cross-pieces transverse to their lumen direction, and that the cross-pieces are arranged at all locations inside one layer tightly superimposed, disposed at predetermined constant intervals, and that the intermediate spaces between the hollow filaments are filled by the cross-pieces at the places of crossing, with the cross-pieces composed of a polymer with a melting point from 80° to 190° C., and having a residual adhesion at room temperature.

Such a module offers the advantage that with production of the hollow filaments, coiling on spools is unnecessary, and the individual strata of hollow filament bands are arranged superimposed and can be combined directly into stacks. For module construction, the already prepared hollow filament component must only still be installed into a housing, and cast into it, so that also production of the modules is considerably simplified.

The polymer suitable for the cross-pieces should not be an unqualified adhesive, but the hollow filaments are fixed form-locking in the cross-pieces, and display a residual adhesion at room temperature, so that the cross-pieces lying superimposed connect in simple manner into different strata, without however sticking fast. Unqualified adhesives, such as for example cyanacrylates, are completely unsuitable.

The melting point of the polymer, suitable for the cross-pieces, lies between 80° and 190° C., whereby in general such polymers having melting points lying between 100° and 160° C. are better suitable. With high viscosity polymers, such as polyamides and polyesters, the working-up temperature must lie clearly higher than the melting point, preferably by about 40° to 50° C. With polymers having a melting point between 100° and 160° C., the working-up temperature amounts to between 150° and 200° C.

So far, polyamides, polyesters, polyethylenes, copolymers of polyethylene and vinyl acetate, as well as copolyether esters, have proved to be suitable.

In surprising manner, one obtains a good sealing of the cross-pieces lying superimposed, when they display a substantially round cross-section. The cross-pieces are only flattened slightly at the tangents with the adjacent strata. A rectangular cross-section of the cross-pieces is then formed, when in particular with high viscosity polymer melts, the cross-pieces are squeezed after the application in a subsequent operation down to the base of the hollow filament strata. Therewith arises a particularly denser cross-piece in the direction of the hollow filaments. The cross-piece diameter should expediently correspond to from about 1.5 to 4 times the diameter of the hollow filaments. It is however preferred that the cross-piece diameter correspond to between 1.8 and 2.2 times the diameter of the hollow filaments.

When it proves to be necessary to reinforce the lateral strength of the hollow filament strata, it is within the scope of the invention also possible to fix the hollow filament strata in a layer through warps transverse to the lumen direction, and to introduce the cross-pieces upon the warps.

The cross- and counter-stream module according to the present invention may be adapted to almost every desired flow profile. It may thereby above all be realized that the stack is composed of several layers put into arrangement. The distance between cross-pieces can in each layer be the same or different. With the usual measurements of about 20 to 200 cm for the module, the distance between adjacent cross-pieces amounts to between 1 and 20 cm. The distances within one layer are generally equal over the length of the hollow filaments. It is preferred to have the cross-piece distances, among different layers in a stack, to form whole number ratios. It is thereby obtained that the cross-pieces of different layers lie superimposed at least according to a determined pattern.

The production of the stack for the cross-counter stream module according to the present invention follows preferably in connection with the production of the hollow filaments, and takes the place of the customary rolling-up arrangement.

Hollow filaments can be produced according to any spin method and from any filament-forming polymer. For example, they can be produced from regenerated cellulose according to the cuoxam or viscose techniques. It is however also possible to spin cellulose hollow filaments from solutions in tertiary amine oxides. Polyester or polyamide hollow filaments are for example produced by the melt spin process. In addition, production of the hollow filament stack can be integrated into the method, instead of the rolling-up arrangement.

The molten polymer forming the cross-pieces is continuously spun into the hollow filament assembly leaving the hollow filament spinning machine at determined intervals from each other, under such an angle that despite progression of the hollow filament assembly, the cross-pieces lie substantially perpendicular to the direction of course of the filaments. An arrangement suitable therefor is composed of a double tube disposed at a sharp angle to the direction of the course of the filaments, the outer tube of which is provided with an open slit running over the entire breadth of the filament assembly, and is held fast, not revolving, whereas the inner tube is placed rotatable, with at least one slit running over the entire breadth in at least one spiral turn, the inner tube being adapted and connected with drive means, whereby the interior space of the inner tube is closed into a container for the molten polymer. This arrangement has the advantage that for a changing nozzle, one can dispense with having to quickly brake at the change point and having to again accelerate in the opposite direction.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic representation in three parts of the module according to the present invention, with 1a, 1b and 1c as follows:

DESCRIPTION OF THE PREFERRED EMBODIMENTS

Figure 1A:
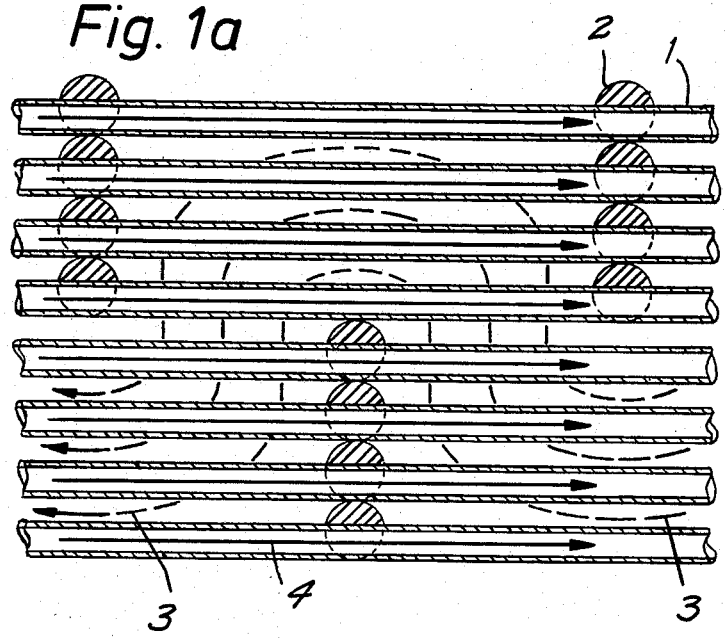
FIG. 1a is a longitudinal section of a stack with four upper levels and four bottom levels.
Figure 1B:
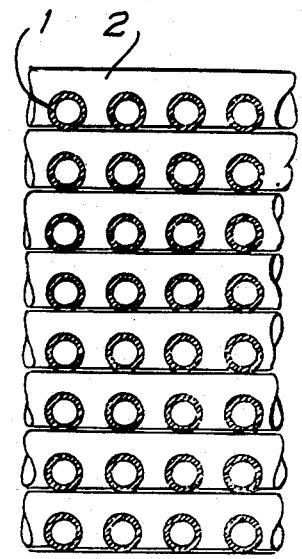
FIG. 1b shows the same as FIG. 1a but in cross-section.
Figure 1C:
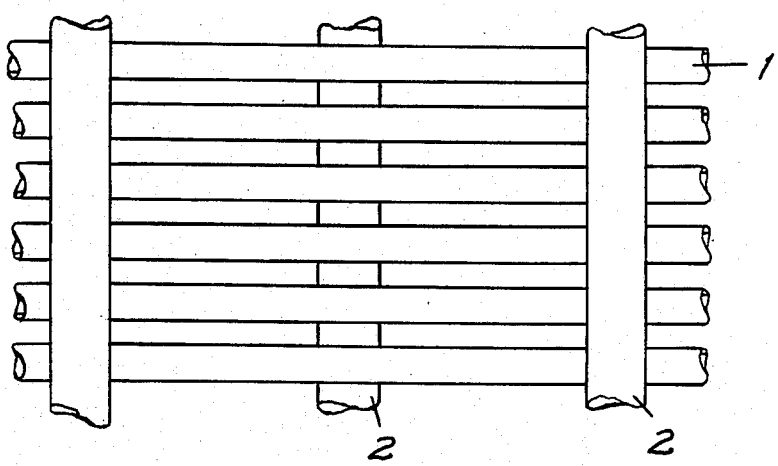
FIG. 1c is an upper view of both FIGS. 1a and 1c.

FIG. 1 shows the arrangement of the hollow filaments 1 in a stack with transition from one layer to the next. Therewith are included the upper four levels of the hollow filaments 1 (four in each level) in longitudinal section (FIG. 1a) and in cross-section (FIG. 1b) in one layer, and the bottom four levels of the hollow filaments 1 in another layer in the stack, which is thereby distinguishable in that the cross-pieces 2 of each layer are arranged exactly superimposed. FIG. 1c is the upper view of FIGS. 1a and 1b. The inserted dashed lines 3 signify the course of flow of the material stream participating in the exchange around the hollow filaments 1, whereas the solid lines with arrows 4 inside the hollow filaments 1 show the course of flow of the other material stream taking part in the exchange, through the hollow filaments 1.

Figure 2:
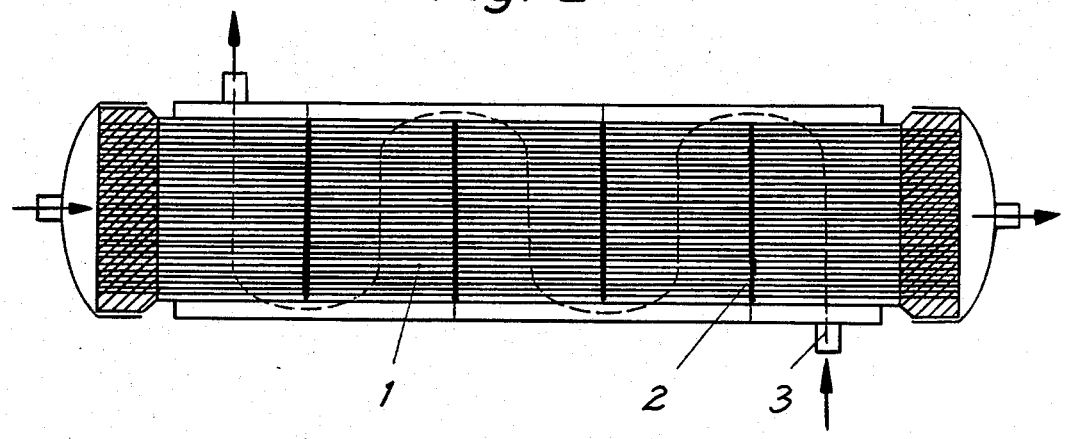
FIG. 2 shows a longitudinal section of a cross-counter-stream module for material and/or heat exchange.

FIG. 2 shows a longitudinal section of a cross-counter-stream module for material and/or heat exchange, in which a stack of only one layer is present, which contains in place one level of hollow filaments 1 fixed transverse to the lumen direction through cross-pieces 2. All of the cross-pieces are arranged exactly superimposed, at the same constant distance from each other. Therewith is shown the course of flow around the hollow filaments 1 through the dashed lines 3.

Figure 3:
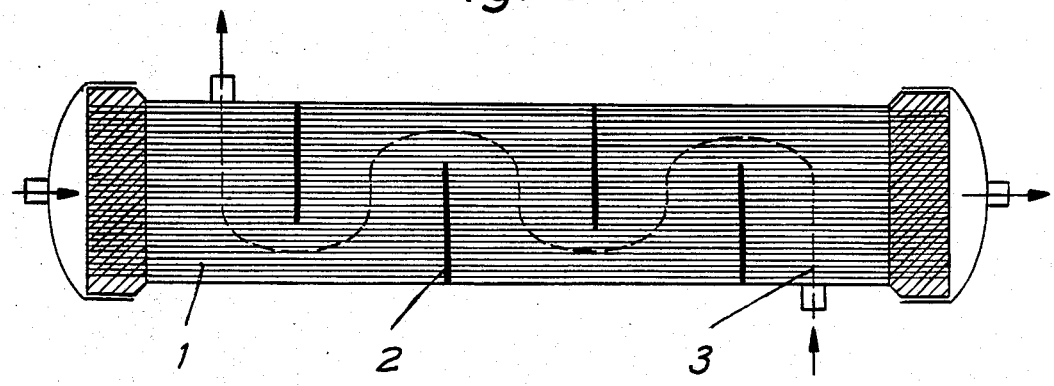
FIG. 3 shows a longitudinal section of a cross-counter-stream module, otherwise similar to the embodiment of FIG. 3, but with one stack composed of three layers.

FIG. 3 shows a longitudinal section of a cross-counter-stream module for material and/or heat exchange, with one stack which is composed of three layers, whereby the ratio of the cross-piece distance in the outer layers to the distance in the layer arranged in the middle amounts to 2:1, i.e. the inner disposed layer is arranged provided with about half the cross-piece distance, compared to the outer disposed layers. Reference numeral 1 identifies the hollow filaments, 2, the cross-pieces, and 3, the course of flow around the hollow filaments 1.

It will be understood that each of the elements described above, or two or more together, may also find a useful application in other types of filament arrangements differing from the types described above.

While the invention has been illustrated and described as embodied in a cross-counter-stream module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Cross-counter-stream material and heat exchange unit comprising a housing, cross-pieces and a stack of hollow filaments cast at their ends in said housing, the hollow filaments secured in a pre-determined pattern, with said cross-pieces tightly superimposed on one another substantially throughout their length and substantially surrounding each filament to allow fluid flow in a predetermined pattern, said cross-pieces being composed of a polymer with a melting point from 80° to 190° C. and with a residual adhesion at room temperature and wherein said cross-pieces have a diameter, the diameter of said cross-pieces corresponding to about 1.5 to 4 times the diameter of said hollow filaments.

2. Cross-counter-stream unit according to claim 1, wherein said polymer is selected from the group consisting of polyamide, polyethylene, copolymer of polyethylene and vinyl acetate, and copolyether-ester and the melting point of the polymer amounts to between 100° and 160° C.

3. Cross-counter-stream module according to claim 1, wherein the cross-pieces display a substantially round cross-section.

4. Cross-counter-stream module according to claim 1, wherein the cross-piece diameter corresponds to 1.8 to 2.2 times the diameter of the hollow filaments.

5. Cross-counter-stream module according to claim 1, wherein the hollow filaments are mounted on warps and the cross-pieces contact the warps.

6. Cross-counter-stream unit according to claim 1, wherein the stack is composed of several layers put into a pattern, each layer having a plurality of separate groups of tightly superimposed cross-pieces, with a ratio of distances between cross-piece groups along the axis of the tubes in one layer to distances between cross-piece groups along the axis of the tubes in another layer of said stack being a whole number ratio.

7. Cross-counter-stream module according to claim 1, wherein intervals between adjacent cross-pieces along the axis of the tubes amount to between 1 and 20 cm.

* * * * *